United States Patent [19]

Sanders et al.

[11] Patent Number: 5,129,686
[45] Date of Patent: Jul. 14, 1992

[54] HOSE CONSTRUCTION, COUPLING THEREFOR AND METHODS OF MAKING THE SAME

[75] Inventors: John D. Sanders, Springfield, Mo.; Homer N. Holden, Sylva, N.C.; Randy C. Foster, Springfield, Mo.

[73] Assignee: Dayco Products, Inc., Dayton, Ohio

[21] Appl. No.: 693,109

[22] Filed: Apr. 25, 1991

Related U.S. Application Data

[62] Division of Ser. No. 408,161, Sep. 15, 1989, Pat. No. 5,037,143.

[51] Int. Cl.$^5$ ............................................. F16L 33/213
[52] U.S. Cl. ................................. 285/258; 285/259; 138/121; 29/507; 29/523
[58] Field of Search ........................ 285/258, 259, 256; 29/507, 523; 138/109, 121, 122, 129, 144

[56] References Cited

U.S. PATENT DOCUMENTS

| | | | |
|---|---|---|---|
| 1,915,041 | 6/1933 | Wallace | 285/259 X |
| 3,072,174 | 1/1963 | Vanderhoof | 29/507 X |
| 3,557,434 | 1/1971 | Delahunty | 29/237 |
| 3,951,438 | 4/1976 | Scales | 285/256 X |
| 4,114,929 | 9/1978 | Knapp | 285/256 X |
| 4,400,022 | 8/1983 | Wright | 285/256 X |
| 4,415,389 | 11/1983 | Medford et al. | 138/121 X |
| 4,625,998 | 12/1986 | Draudt et al. | 285/7 |
| 4,683,917 | 8/1987 | Bartholomew | 138/121 |
| 4,729,583 | 3/1988 | Lalikos | 285/256 X |

FOREIGN PATENT DOCUMENTS

| | | | |
|---|---|---|---|
| 2316525 | 1/1977 | France | 285/258 |
| 45512 | 12/1955 | United Kingdom | 285/259 |

Primary Examiner—Dave W. Arola
Attorney, Agent, or Firm—Joseph V. Tassone

[57] ABSTRACT

A hose construction, coupling therefor and methods of making the same are provided, the hose construction comprising a tubular hose and a coupling secured to one end of the tubular hose, the inner peripheral surface of the tubular hose comprising an inner corrugated hose made of polymeric material and having inwardly convex projections with recesses therebetween and extending from one end of the tubular hose to the other end thereof, the coupling having an insert disposed in the one end of the tubular hose and being radially outwardly expanded into sealing relation with the inner corrugated hose, the insert having an outer peripheral surface defined by a plurality of outwardly convex projections with recesses therebetween, the projections of the insert being respectively received in the recesses of the inner hose and the projections of the inner hose being respectively in the recesses of the insert whereby the interior of the tubular hose is substantially sealed to the interior of the coupling.

20 Claims, 7 Drawing Sheets

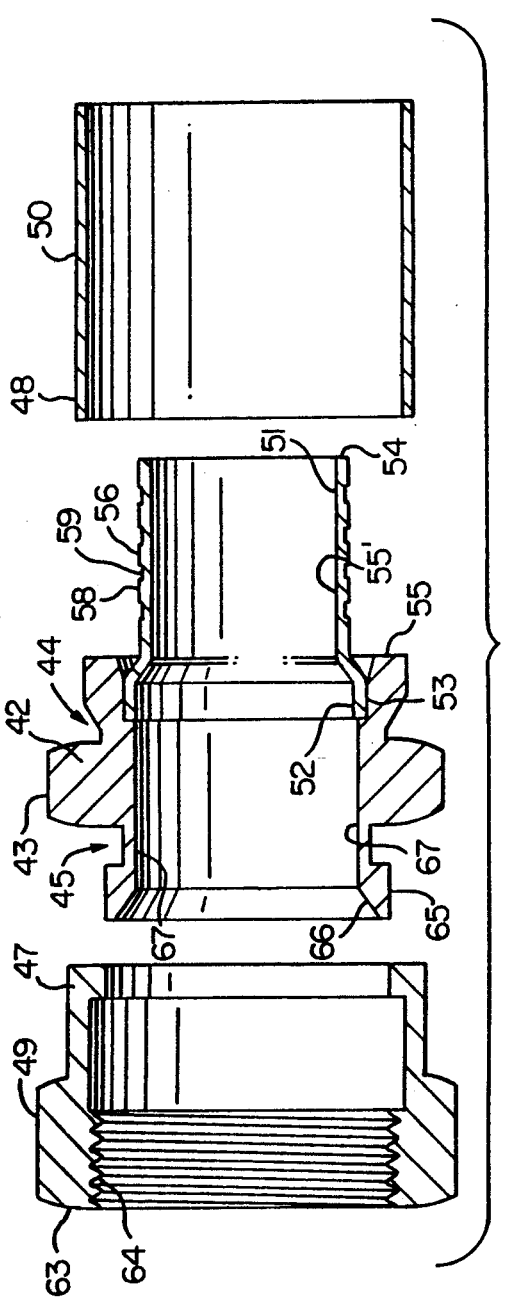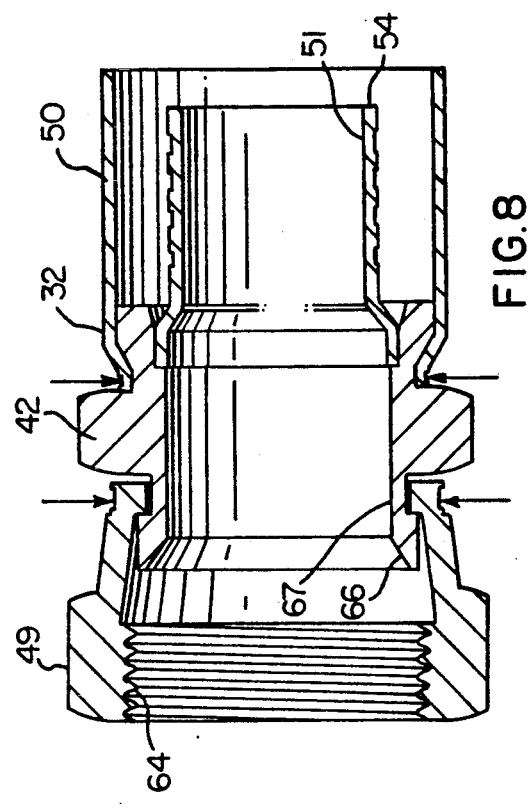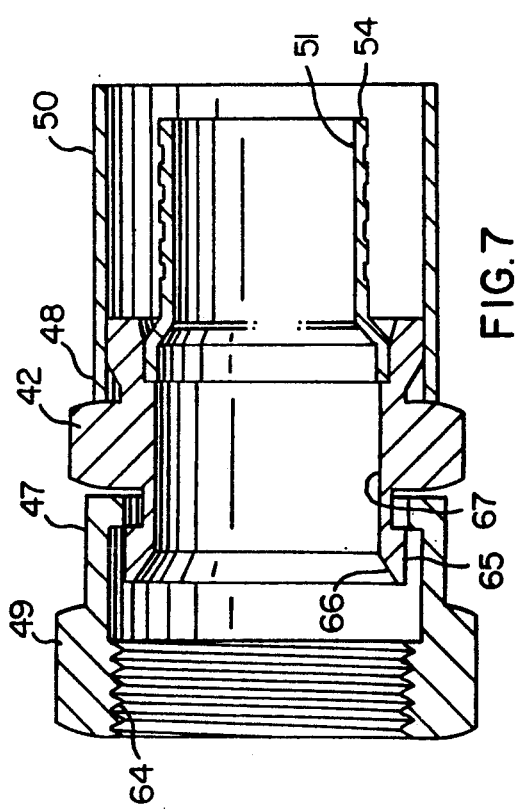

HOSE CONSTRUCTION, COUPLING THEREFOR AND METHODS OF MAKING THE SAME

CROSS REFERENCE TO RELATED APPLICATIONS

This application is a divisional patent application of its copending parent patent application, Ser. No. 408,161, filed Sept. 15, 1989 now U.S. Pat. No. 5,037,143 issued Aug. 6, 1991.

BACKGROUND OF THE INVENTION

1. Field of the Invention

This invention relates to a new hose construction and to a new coupling therefor as well as to a new method of making such a hose construction and a new method of making such a coupling.

2. Prior Art Statement

It is known to provide a hose construction comprising a tubular hose having an inner peripheral surface means and an outer peripheral surface means, and a coupling secured to one end of the tubular hose. For example, see the U.S. Pat. No. 4,400,022 to Wright, and the U.S. Pat. No. 3,557,434 to Draudt.

It is also known to radially outwardly expand a metallic sleeve in a hose after such sleeve has been inserted into one end of the hose. For example, see the U.S. Pat. No. 3,072,174 to Vanderhoof, and the U.S. Pat. No. 3,5575,434 to Delahunty.

SUMMARY OF THE INVENTION

It is one feature of this invention to provide a new hose construction wherein a tubular hose having an inner corrugated hose made of polymeric material and having inwardly convex projections with recesses therebetween and extending from one end of the hose to the other end thereof is uniquely coupled to a coupling so that the interior of the tubular hose is substantially sealed to the interior of the coupling.

In particular, it was found according to the teachings of this invention that the coupling can have a unique insert means provided with an outer peripheral surface means that is defined by a plurality of outwardly convex projections with recesses therebetween and can be radially outwardly expanded into sealing relation with the inner corrugated hose in such a manner that the projections of the insert means are respectively received in the recesses of the inner hose and the projections of the inner hose are respectively received in the recesses of the insert means so that the interior of the tubular hose is substantially sealed to the interior of the coupling.

For example, one embodiment of this invention provides a hose construction comprising a tubular hose having an inner peripheral surface means and an outer peripheral surface means, and a coupling secured to one end of the tubular hose, the inner peripheral surface means of the tubular hose comprising an inner corrugated hose made of polymeric material and having inwardly convex projections with recesses therebetween and extending from one end of the tubular hose to the other end thereof, the coupling having an insert means disposed in the one end of the tubular hose and being radially outwardly expanded into sealing relation with the inner corrugated hose, the insert means having an outer peripheral surface means defined by a plurality of outwardly convex projections with recesses therebetween, the projections of the insert means being respectively received in the recesses of the inner hose and the projections of the inner hose being respectively received in the recesses of the insert means whereby the interior of the tubular hose is substantially sealed to the interior of the coupling.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Another object of this invention is to provide a new coupling for such a hose construction, the coupling of this invention having one or more of the novel features of this invention as set forth above or hereinafter shown or described.

Another object of this invention is to provide a new method of making such a coupling, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 6 is an exploded cross-sectional view illustrating the various parts of the coupling of the hose construction of FIG. 1.

FIG. 7 is a view similar to FIG. 6 and illustrates the parts of FIG. 6 in the assembled relation thereof and before such assembled parts have been secured together.

FIG. 8 is a view similar to FIG. 7 and illustrates how the assembled parts of FIG. 7 are fastened together.

DESCRIPTION OF THE PREFERRED EMBODIMENTS

Figure 1:
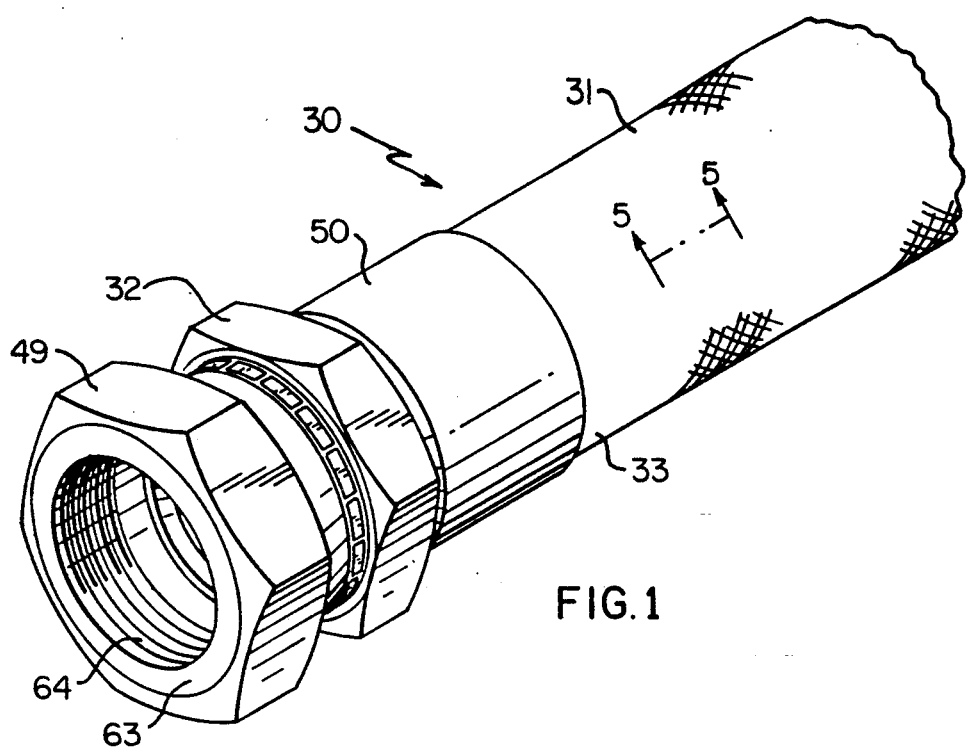
FIG. 1 is a fragmentary perspective view of the new hose construction of this invention.

While the various features of this invention are hereinafter illustrated and described as being particularly adapted to provide a hose construction for conveying gasoline and like volatile liquids therethrough, it is to be understood that the various features of this invention can be utilized singly or in various combinations thereof to provide a hose construction for conveying other fluid therethrough for other types of apparatus as desired.

Therefore, this invention is not to be limited to only the embodiments illustrated in the drawings, because the drawings are merely utilized to illustrate one of the wide variety of uses of this invention.

Figure 9:
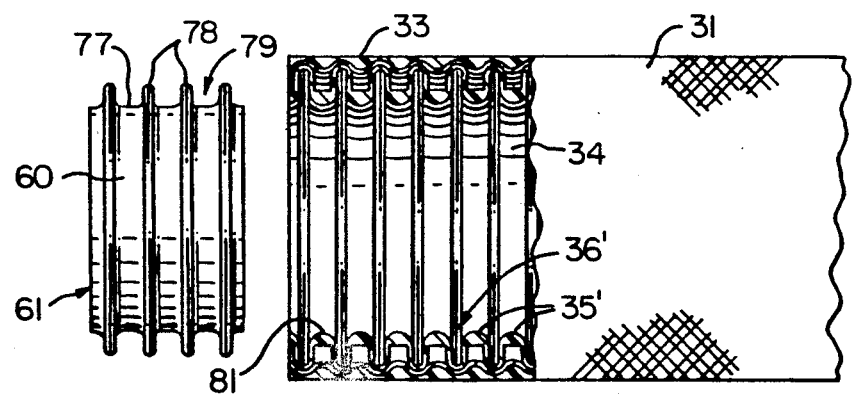
FIG. 9 is an exploded view, partially in cross section, and illustrates how a part of the insert means of the coupling of this invention is to be disposed in one end of the hose for forming the hose construction of FIG. 1.

Referring now to FIG. 1, the new hose construction of this invention is generally indicated by the reference numeral 30 and comprises a tubular hose 31 and a coupling 32 secured to one end 33 (FIGS. 9 and 10) of the hose 31 in a manner hereinafter set forth. Of course, a like coupling 32 or any other suitable structure can be secured to the other end (not shown) of the hose 31, if desired.

As previously set forth, one of the features of this invention is to uniquely interconnect the coupling 32 of this invention to the hose 31 so as to provide for a fluid sealed relation between the interiors thereof. Such unique means for providing such sealed relation is necessitated by the unique construction of the hose 31. However, the unique construction of the hose 31 comprises the invention of others and is set forth in the copending patent application, U.S. patent application Ser. No. 405,487, filed Sept. 11, 1989 now U.S. Pat. No. 5,089,074, issued Feb. 18, 1992.

Therefore, only the details of the hose 31 will now be set forth that are believed to be necessary to understand the features of this invention in forming the hose construction 30 of this invention with the understanding that the unique features of the hose 31 per se are being claimed in the aforementioned copending patent application.

Figure 5:
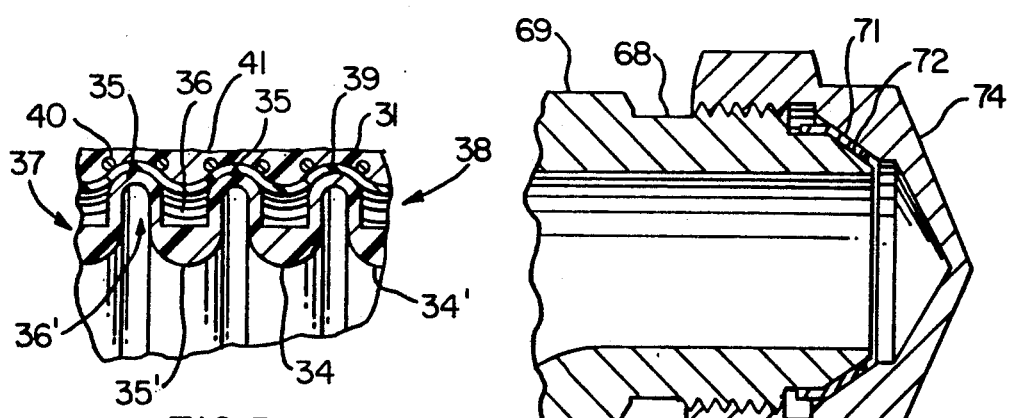
FIG. 5 is an enlarged fragmentary cross-sectional view that is taken substantially in the direction of the arrows 5—5 of FIG. 1 and illustrates the construction of the hose of the hose construction of FIG. 1.

As illustrated in FIG. 5, the hose 31 comprises an inner corrugated hose 34 formed of any suitable polymeric material and having a plurality of outwardly convex projections 35 with recesses 36 therebetween and extending from one end 37 to the other end 38 thereof, a tube 39 of any suitable polymeric material and extending in a generally straight line manner from projection 35 to projection 35 as illustrated in FIG. 5, an outer sleeve 40 of any suitable reinforcing material disposed in telescoped relation on the tube 39, and an outer layer 41 of any suitable polymeric material that will provide a protection for the sleeve 40 of reinforcing material and also to tend to prevent any liquid that is conveyed through the flexible hose 31 from permeating to the exterior thereof, such as gasoline or the like.

Figure 19:
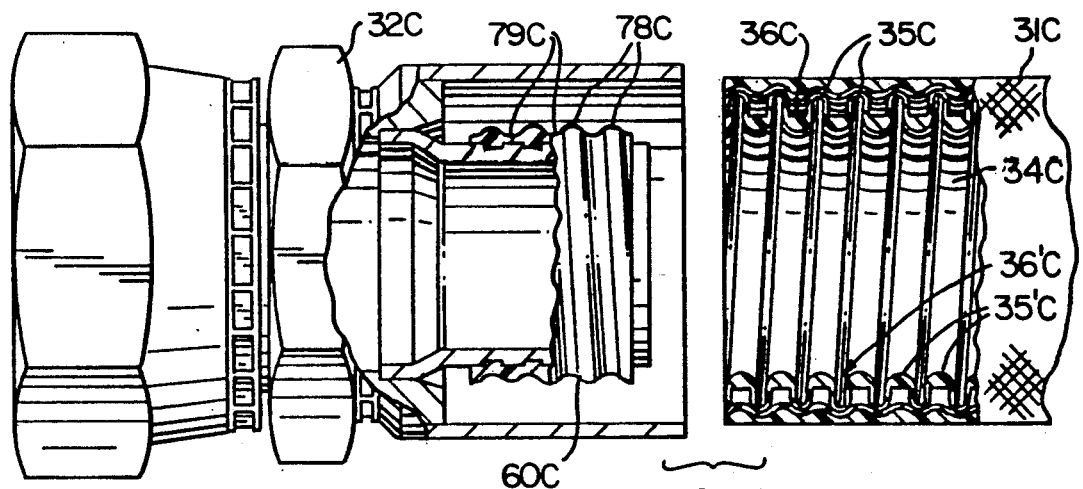
FIG. 19 is a view similar to FIG. 16 and illustrates another hose construction of this invention.
Figure 20:
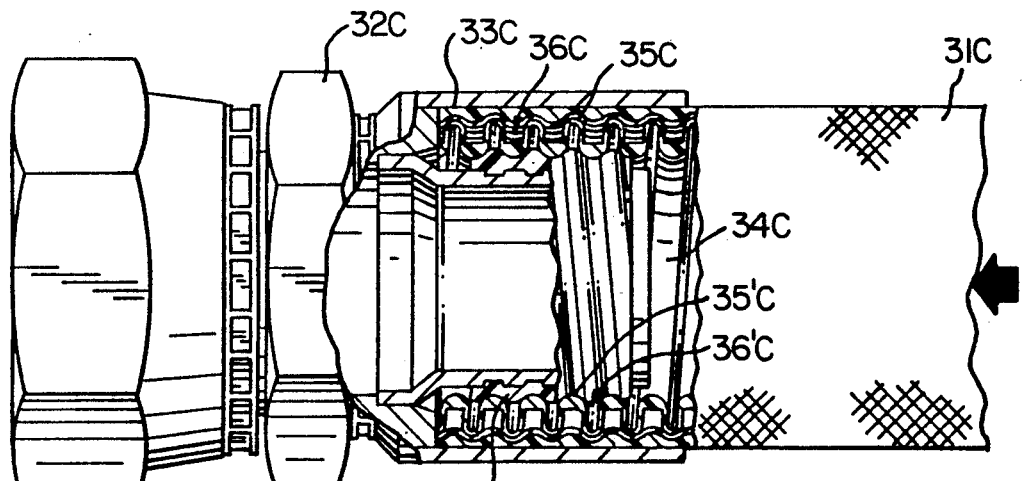
FIG. 20 is a view similar to FIG. 19 and illustrates the coupling of FIG. 19 telescoped with the end of the hose of FIG. 19.
Figure 21:
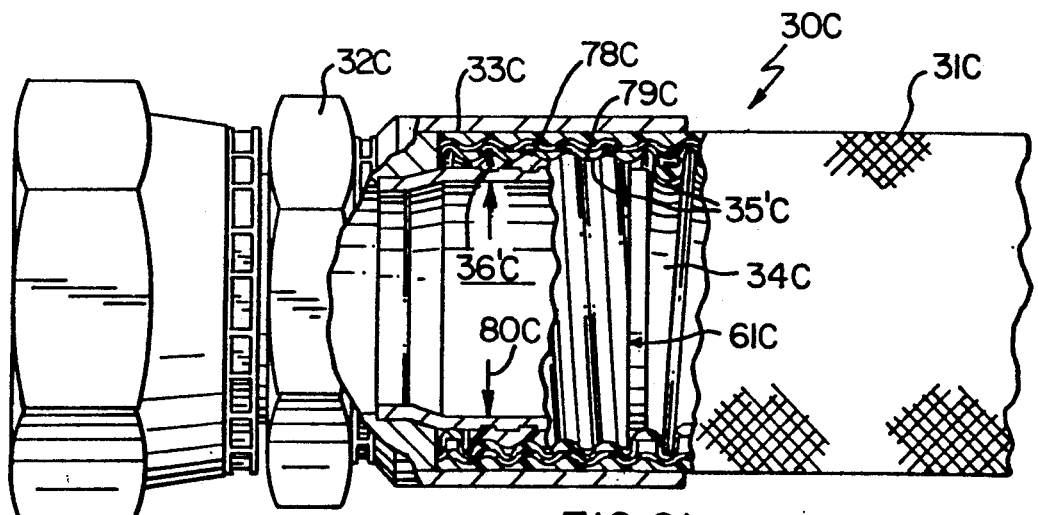
FIG. 21 is a view similar to FIG. 20 and illustrates the insert means of the coupling of FIG. 20 having been radially outwardly expanded into sealing relation with the hose of FIG. 20 to complete the hose construction of this invention.

While the inner hose 34 of the hose 31 can be formed of any suitable material and in any suitable manner, one working embodiment thereof comprises thermoplastic material that is blow molded in a conventional manner into the configuration illustrated in FIG. 5 wherein the outwardly directed convolutions or projections 35 are annular and are uniformly spaced from each other throughout the length of the hose 31 or can be disposed in a helical manner throughout the length of the hose as represented by the projections 35C in FIGS. 19-21 wherein the inner hose 34C is made in a conventional manner by spirally winding in overlapping relation a strip that has the projections 35C and recesses 36C formed therein in any suitable manner and forming a helically disposed seam throughout the length of the inner hose 34C.

In any event, the thermoplastic material of the inner hose 34 or 34C is chosen based on the chemical and thermal resistance requirements of the application of the hose construction 30 and based on a means to bond the corrugated inner hose 34 or 34C to the subsequently disposed layers thereon Thus, the inner hose 34 or 34C can comprise a single layer of homogeneous thermoplastic material as illustrated in the drawings or the same can comprise an inner layer of one type of thermoplastic material and an outer layer of another type of thermoplastic material as it is well known that two different plastic materials can be extruded together to form a tubular member having one material forming the outer surface thereof and the other forming the inner surface thereof and thereafter such tubular member can be blow molded to form the same into a corrugated tubular member.

In any event, the tube 39 of polymeric material can be applied over the inner hose 34 either as a continuous tube by conventional extruding apparatus whereby the exuding tube 39 bonds by the nature thereof to the apexes of the projections 35 in the substantially straight line manner illustrated in FIG. 5 or the tube 39 can be formed by helically wrapping a strip onto the inner tube 34. In any event, the tube 39 provides a smooth surface over the convolutions 35 and provides a consistent base for receiving the reinforcement 40 thereon. The material of the tube 39 is chosen so that it will adhere to the outer surface of the projections 35 of the inner tube 34 so that the layer 39 does not fill the recesses 36 of the inner tube 34 because if the layer 39 were to fill the recesses 36, not only would the tube 39 then reduce the desired flexibility characteristics of the inner hose 34, but also the same would then allow the reinforcement 40 to enter those recesses 36 to further reduce the flexibility of the inner hose 34.

After the outer tube 39 has been applied in place in the manner previously set forth, the reinforcement sleeve 40 of either a braided textile material or a metal wire material that is wound in alternating directions is disposed over the tube 39 and the amount of reinforcement provided is dependent upon the working pressure requirements of the hose construction 30.

Thereafter, the outer layer 41 of any suitable polymeric material is applied over the reinforcement 40, such as by being extruded as a continuous tube thereof by conventional extruding apparatus, to complete the hose 31, the outer layer 41 providing protection for the reinforcement 40 and readily bonding to the inner tube 39 by exuding through the reinforcement 40 so as to hold all of the layers of the hose 31 in a bonded condition thereof Thus, the material of the outer layer 41 not only protects the reinforcement 40 from physical or chemical damage, but also the cover layer 41 is chosen with consideration to the environment and bondability of the other layers of the hose 31. In addition, the material 41 can be chosen so as to tend to prevent the liquids flowing through the hose 31 from permeating through the hose 31 to the exterior thereof.

In one working embodiment of the hose construction 30 of this invention, the inner hose 34 of the hose 31 is formed of two extruded layers with the inner layer comprising a thermoplastic material sold by DuPont as Zytel ST811HS and with the outer layer thereof comprising a thermoplastic material sold by the B. F. Goodrich Company as ESTANE 5710F1. Such material is blow molded so as to form the hose 34 with an inside diameter of approximately 1.500 of an inch and with the distance between the apexes of the projections 35 being approximately 0.246 of an inch. The thickness of the inner portions of the hose 34 is approximately 0.045 of an inch while the sidewalls between the inner portions and the apexes of the projections 35 are actually disposed at an angle relative to each other rather than being parallel to each other as illustrated throughout the drawings with such angle being approximately 10° to a true transverse line passing through the inner hose 34. The tube 39 comprises the thermoplastic material ESTANE 5710F1 and is approximately 0.040 of an inch thick while the reinforcement 40 comprises a polyester yarn formed on a thirty-six carrier braiding machine with two ends per carrier and the outer layer 41 comprises the thermoplastic material ESTANE 5710F1 and is approximately 0.060 of an inch thick.

It is to be understood that the above example of one working embodiment of the hose 31 is not to be a limitation on this invention. Nevertheless, it can be seen that the resulting interior peripheral surface means 34' of the hose 31 is defined by the inwardly convex projections 35' with the recesses 36' therebetween and thereby requires unique means to seal to the same.

The coupling 32 of this invention for sealing to the inner peripheral surface means 34' of the hose 31 is formed of any suitable metallic material and comprises a tubular body member 42 having a hexagonal nut-like portion 43 disposed intermediate two annular recesses 44 and 45 thereof and into which ends 47 and 48 of a rotatable nut 49 and outer sleeve 50 are radially inwardly deformed in the manner illustrated in FIG. 8, the nut 49 being rotatable relative to the body member 42 while the outer sleeve 50 is interconnected to the body member 42 in substantially a nonrotatable manner therewith.

An inner sleeve 51 of the coupling 32 has one end 52 thereof secured in an internal annular recess 53 of the body member 42, such as by brazing or the like, so that the other end 54 of the sleeve 51 projects out of an end 55 of the body member 42, the sleeve 51 having a substantially smooth internal peripheral surface means 55' and a corrugated external peripheral surface means 56 defined by a plurality of outwardly blunt projections 58 with recesses 59 therebetween. The projections 58 and recesses 59 are annular but could be helically formed, if desired.

The sleeve 51 is formed of a metallic material that readily permits the same to be radially outwardly expanded from the condition illustrated in FIG. 8 to the condition illustrated in FIG. 12 whereby the sleeve 51 cooperates with a separate part 60 of polymeric material to form an insert means that is indicated by the reference numeral 61 in FIG. 12 to cooperate with the inner corrugated hose 34 of the hose 31 to seal therewith as will be apparent hereinafter.

While the coupling 32 can be formed of any suitable material, in one working embodiment that couples to the previously set forth working embodiment of the hose 31 the body member 42 and nut 49 are formed of brass while the sleeves 50 and 51 are formed of copper. The end 54 of the sleeve 51 has an outside diameter of approximately 1.305 to 1.315 of an inch in the unexpanded condition thereof as illustrated in FIG. 8 and is approximately 1.700 of an inch in length while having a wall thickness of approximately 0.065 of an inch.

The nut 49 has its end 63 internally threaded at 64 so as to couple the coupling 32 to any desired structure.

The end 65 of the body part 42 of the coupling 32 is internally flared at 66 so as to fluidly seal an internal peripheral surface means 67 of the coupling 32 to the desired structure.

For example, the nut 49 of a hose construction 30 of this invention can be coupled to a nipple 68 of a T-shaped metallic coupler 69 by the nut 49 threading onto an externally threaded part 70 of the coupler 69 while the flared end surface 66 of the body member 42 compacts a copper washer 71 against a flared surface 72 of the nipple 68 so as to fluid seal the interior surface means 67 of the coupler 69 to an internal peripheral surface means 73 of the coupler 69.

Figure 2:
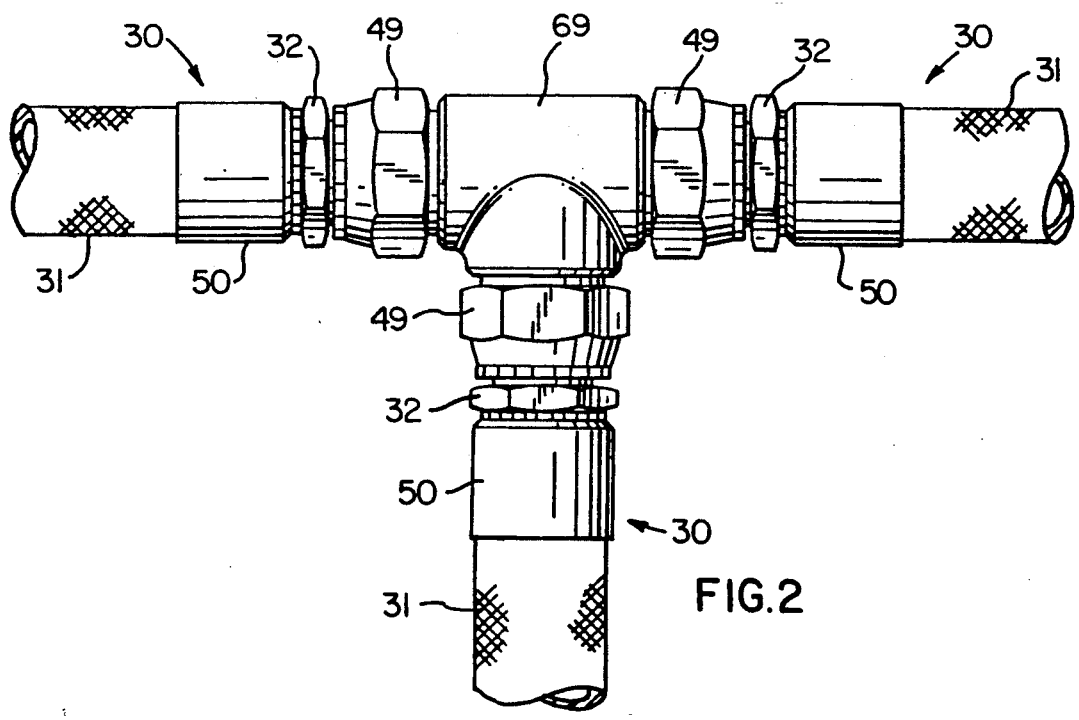
FIG. 2 is a reduced fragmentary view illustrating how three hose constructions of FIG. 1 can be coupled together by a T-shaped coupling member.

In fact, the coupler 69 comprises a T-member as illustrated in FIG. 2 wherein three hose constructions 30 of this invention can be coupled to the T-member 69 so as to provide an inlet hose construction to the T-connector 69 and two outlet hose constructions 30 leading therefrom for any desired purpose.

Figure 4:
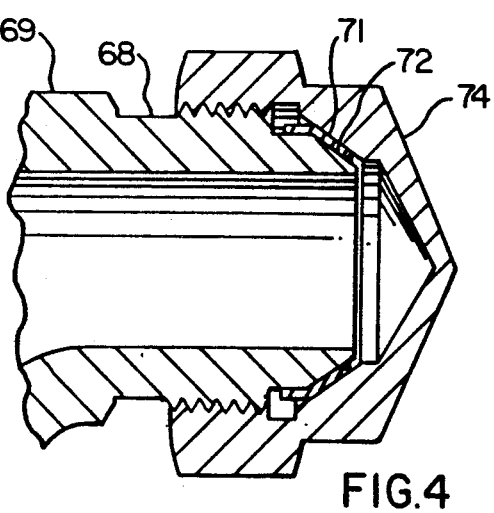
FIG. 4 is a view similar to FIG. 3 and illustrates how one of the nipples of the T-shaped coupler of FIG. 2 can be closed off by an end cap.

While three hose constructions 30 are interconnected to the T-member 69 in FIG. 2, it is to be understood that one or more of the nipples 68 of the T-coupler 69 could be closed off by a suitable cap means, such as cap means 74 illustrated in FIG. 4 that compacts a washer 71 against the surface 72 of the nipple 68 to seal closed the nipple 68 as illustrated.

Of course, it is to be understood that the nuts 49 of the hose constructions 30 of this invention can couple to other tubular threaded means than a T-connector as desired.

Figure 10:
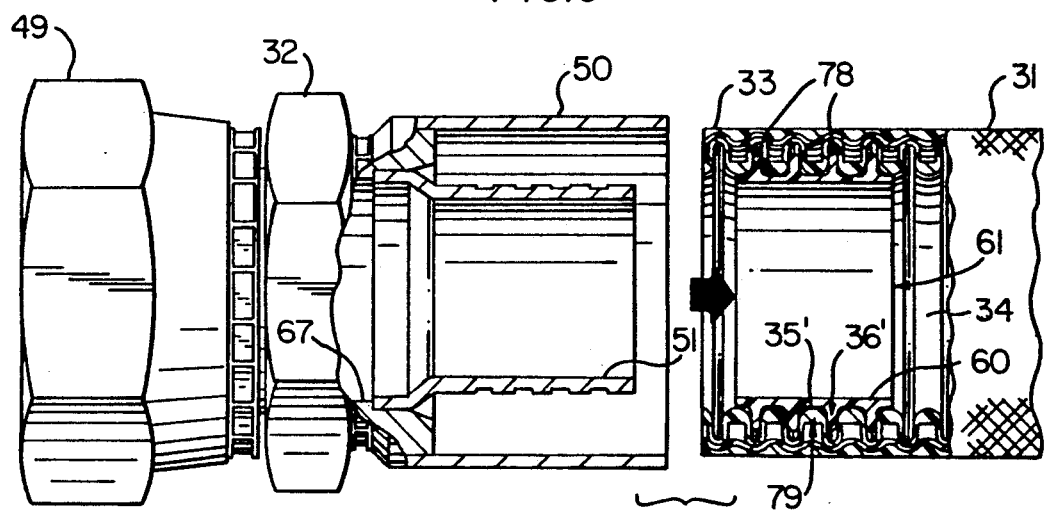
FIG. 10 is a fragmentary view, partially in cross section, and illustrates how the coupling member is to be assembled to the arrangement of FIG. 9.

The polymeric member 60 for forming the insert means 61 of the coupler 32 of this invention with the sleeve 51 has a smooth internal peripheral surface 76 passing therethrough as illustrated in FIG. 10 while an exterior peripheral surface 77 of the member 60 comprises a plurality of outwardly convex projections 78 with recesses 79 therebetween, the projections 78 and recesses 79 being annular because the same is being utilized with a hose 31 wherein the inner hose 34 has the inwardly directed projections 35' thereof also being formed as annular whereas the projections 78 of the member 60 could be helically disposed if the inner hose 34 had the projections 35' thereof disposed helically as provided by such projections 35'C in FIGS. 19–21 and hereinafter described.

In any event, one working embodiment of the member 60 for the previously set forth one working embodiment of the hose 31 has four annular projections 78 with the apexes thereof defining a diameter of approximately 1.810 inches and being spaced from each other approximately 0.246 of an inch. The apexes of the projections 78 are defined by a radius of approximately 0.030 of an inch with the sidewalls thereof being angled approximately 4° to a true transverse line passing through the member 60 and with the internal peripheral surface means 76 defining a diameter of approximately 1.440 inches. The overall length of the member 60 is approximately 0.984 of an inch. In such working embodiment of the member 60, the same is molded from a thermoplastic material sold as Morthane PS498-500 by the Morton Thiokol Company.

In this manner, it can be seen that the member 60 is adapted to be readily inserted within the end 33 of the hose 31 in the manner illustrated in FIG. 10 so that the projections 78 of the member 60 are partially received in the recesses 36' of the inner hose 34 while the projections 35' of the inner hose 34 are partially received in the recesses 79 of the member 60, such insertion being permitted by the relative flexible nature of the member 60 and the projections 35' of the inner hose 34.

Figure 11:
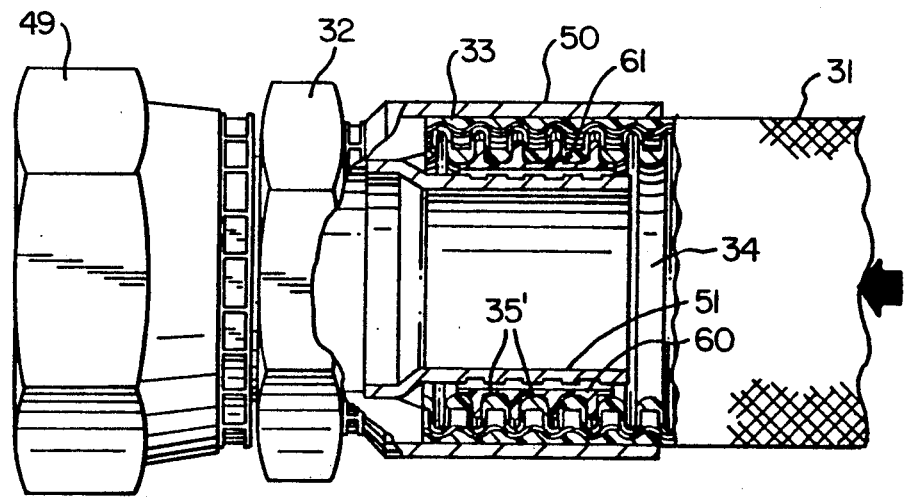
FIG. 11 is a view similar to FIG. 10 and illustrates the coupling of FIG. 10 having been telescoped with the end of the hose of FIG. 10.

Thereafter, the coupling 32 as illustrated in FIG. 10 is telescoped with the end 33 of the hose 31 so that the sleeve 51 is disposed inside of the member 60 and the outer sleeve 50 is disposed over the end 33 of the hose 31 in the manner illustrated in FIG. 11.

Figure 12:
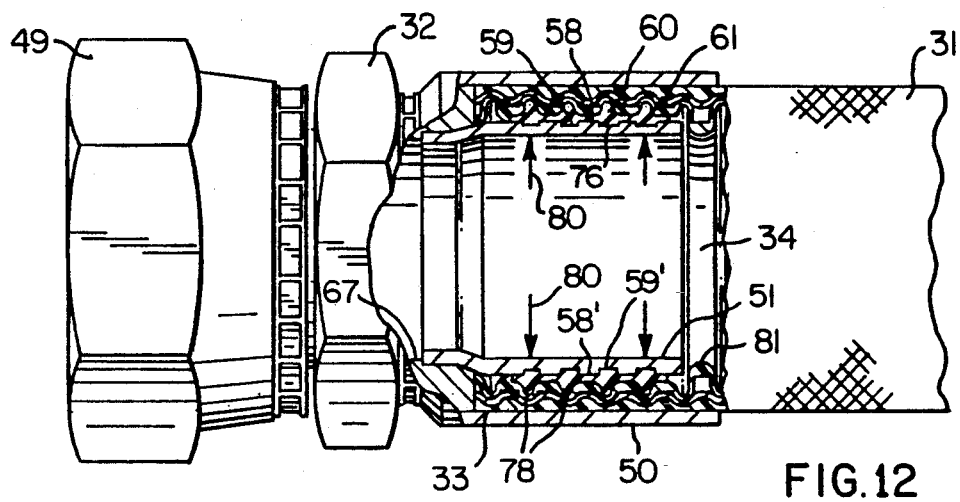
FIG. 12 is a view similar to FIG. 11 and illustrates how the insert means of the coupling is radially outwardly expanded into its sealing relation with the hose of FIG. 11 to complete the hose construction of FIG. 1.

Thereafter, the inner sleeve 51 is outwardly radially expanded as provided by the arrows 80 in FIG. 12 and in a manner well known in the art, such as set forth in the aforementioned U.S. Pat. No. 3,072,174 to Vanderhoof, and the U.S. Pat. No. 3,557,434 to Delahaunty which are being incorporated into this disclosure by this reference thereto, to not only cause the projections 58 of the sleeve 51 to deform into the internal peripheral surface 76 of the member 60 to form recesses 58' therein and to cause projections 59' of the member 60 to form in the recesses 59 of the sleeve 51 as illustrated in FIG. 12 to firmly fasten the member 60 onto the sleeve 51, but also to radially outwardly expand the member 60 and cause the hose end 33 to compact against the outer sleeve 50 so that the projections 78 of the member 60 firmly move into the recesses 36' of the inner hose 34 of the hose 31 and to cause the inward projections 35' of the inner hose 34 of the hose 31 to more firmly move into the recesses 79 of the member 60 to fluidly seal the interior or internal surface means 67 of the coupling 32 to the interior or internal surface means 81 of the hose 31 in the manner illustrated in FIG. 12 so as to prevent any fluid leakage therebetween even though a volatile liquid, such as gasoline or the like, is being conveyed through the interior of the hose construction 30.

It is believed that this unique sealing effect is caused by the fact that the projections 35' of the inner hose 34 can readily be shaped into sealing relation with the recesses 79 of the member 60 because of the voids 36 in the inner hose 34 between the projections 35' thereof.

Thus, the radially outwardly expanded sleeve 51 causes the member 60 to form thereon and thereby define the external peripheral surface means of the insert 61 that forms into the inner hose 34 of the hose 31 as well as to fasten the end of the hose 31 in compressed relation between the sleeves 51 and 50 as illustrated in FIG. 12 to securely fasten the hose 31 to the coupling 32.

Therefore, it can be seen that the coupling 32 is readily fastened to the hose 31 by the method of this invention through the insert means 61 of the coupling 32 which also fluidly seals the coupling 32 to the hose 31 by the method of this invention as previously set forth.

While the hose construction 30 previously described has the member 60 being separate from the coupling 32 until after the sleeve 51 has been radially outwardly expanded in the manner previously set forth, it is to be understood that the member 60 could comprise part of the coupling 32 before the sleeve 51 is radially outwardly expanded.

Figure 15:
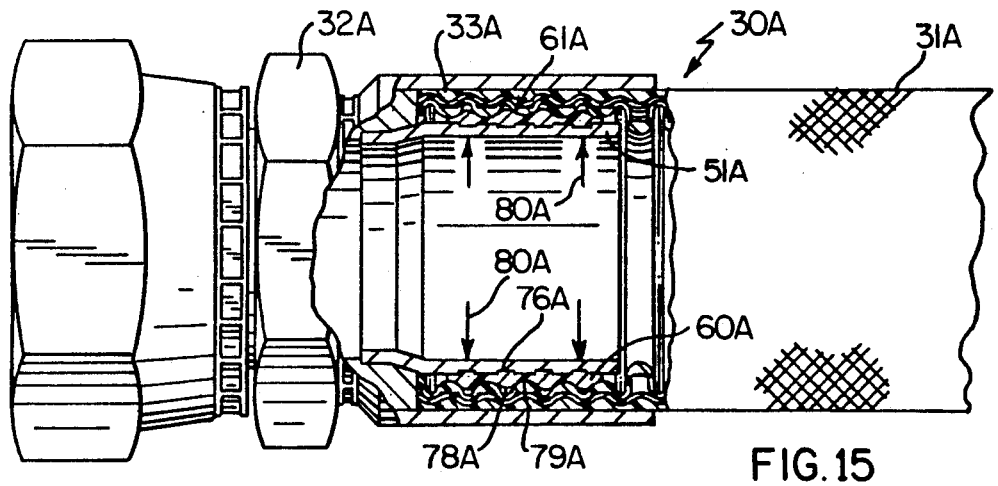
FIG. 15 is a view similar to FIG. 14 and illustrates the insert means of the coupling being radially outwardly expanded into sealing relation with the hose of FIG. 14 to complete the hose construction of this invention.
Figure 3:
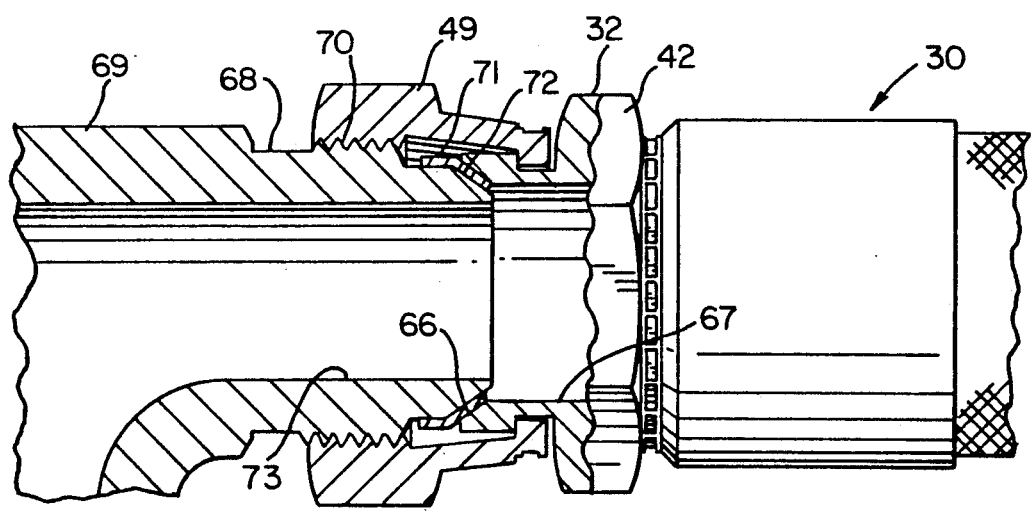
FIG. 3 is an enlarged fragmentary view, partially in cross section, illustrating how one of the hose constructions of FIG. 2 is coupled to one of the nipples of the T-shaped coupler of FIG. 2.
Figure 13:
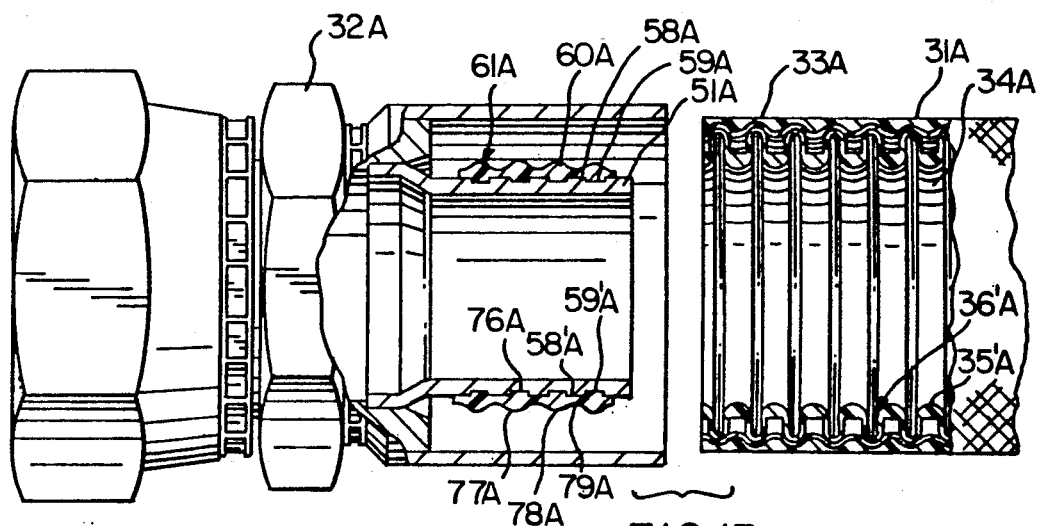
FIG. 13 is a view similar to FIG. 10 and illustrates another hose construction of this invention.
Figure 14:
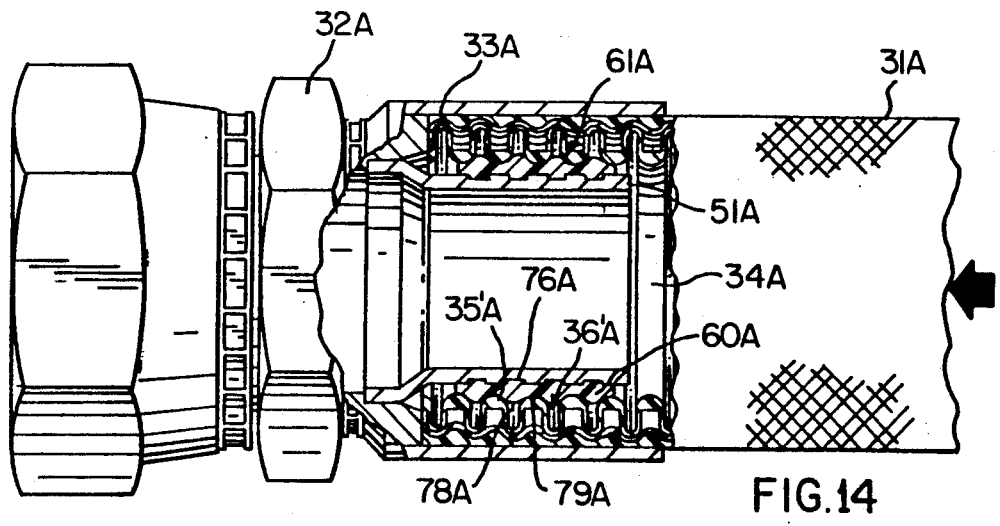
FIG. 14 is a view similar to FIG. 13 and illustrates how the coupling of FIG. 13 is telescoped with the end of the hose of FIG. 13.

In particular, another hose construction of this invention is generally indicated by the reference number 30A in FIGS. 13–15 and parts thereof similar to the hose construction 30 previously set forth are indicated by like reference numerals followed by the reference letter "A".

As illustrated in FIGS. 13–15, the hose construction 30A is substantially the same as the hose construction 30 previously described except that the coupling 32A has the member 60A initially molded on the sleeve 51A as illustrated in FIG. 13 so that the member 60A has its internal peripheral surface 76A provided with a plurality of inwardly directed annular projections 59'A received within the annular recesses 59A of the sleeve 51A while the annular projections 58A of the sleeve 51A are received in annular recesses 58'A of the member 60A so that the member 60A is securely fastened to the sleeve 51A.

The external peripheral surface 77A of the member 60A has a plurality of outwardly directed convex projections 78A with recesses 79A therebetween.

In one working embodiment of the member 60A that cooperates with the one working embodiment of the hose 31 previously set forth, the projections 78A have the apexes thereof defining a diameter of approximately 1.510 inches, are spaced apart approximately 0.242 of an inch and are defined on a radius of approximately 0.050 of an inch while the recesses 79A thereof are defined on a radius of approximately 0.070 of an inch so that substantially straight tangent sections connect the radiuses of the recesses 79A and projections 78A together in the smooth manner as illustrated.

It can readily be seen that the coupling 32A of FIG. 13 is adapted to be telescoped with the end 33A of the hose 31A and then the insert means 61A is adapted to be radially outwardly expanded in the manner illustrated in FIG. 15 as indicated by the arrows 80A whereby the projections 78A are received in the recesses 36'A of the inner hose 34A in the recesses 79A of the insert means 61A to completely fluid seal the interior of the hose 31A to the interior of the coupling 32A as previously set forth.

While the hose constructions 30 and 30A previously described each has a polymeric part forming the insert means 61 or 61A thereof, it is to be understood that the metallic sleeve of the coupling itself could be corrugated to perform the sealing function thereof.

Figure 16:
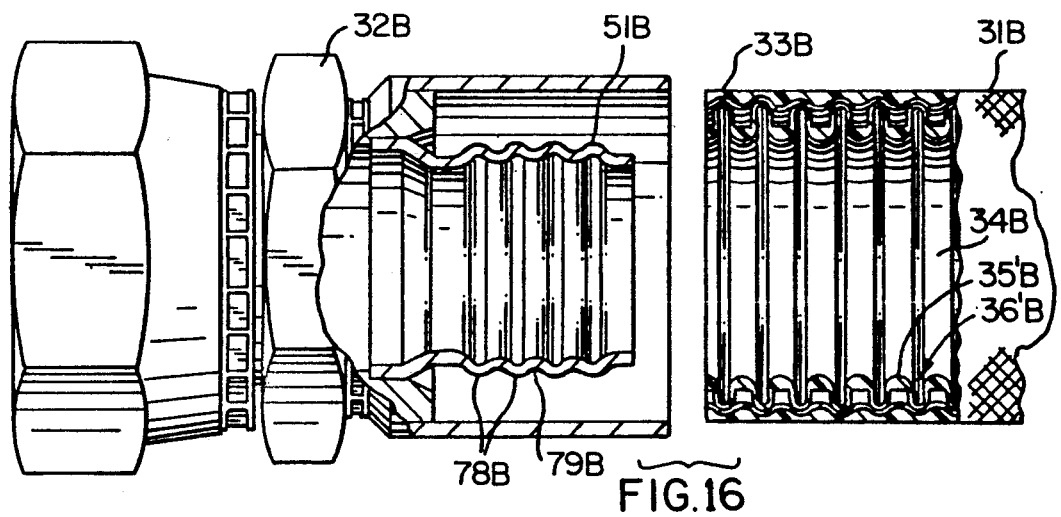
FIG. 16 is a view similar to FIG. 13 and illustrates another hose construction of this invention.
Figure 17:
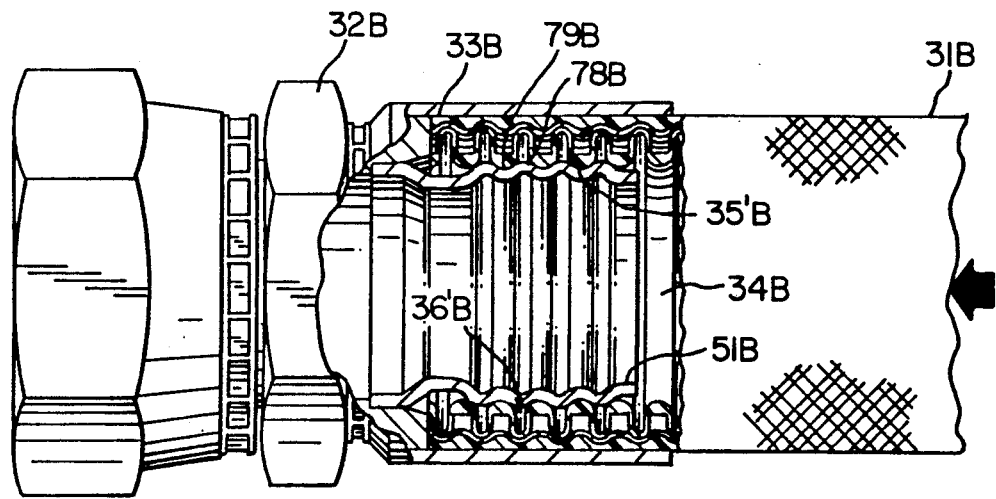
FIG. 17 is a view similar to FIG. 16 and illustrates the coupling of FIG. 16 telescoped with the end of the hose of FIG. 16.
Figure 18:
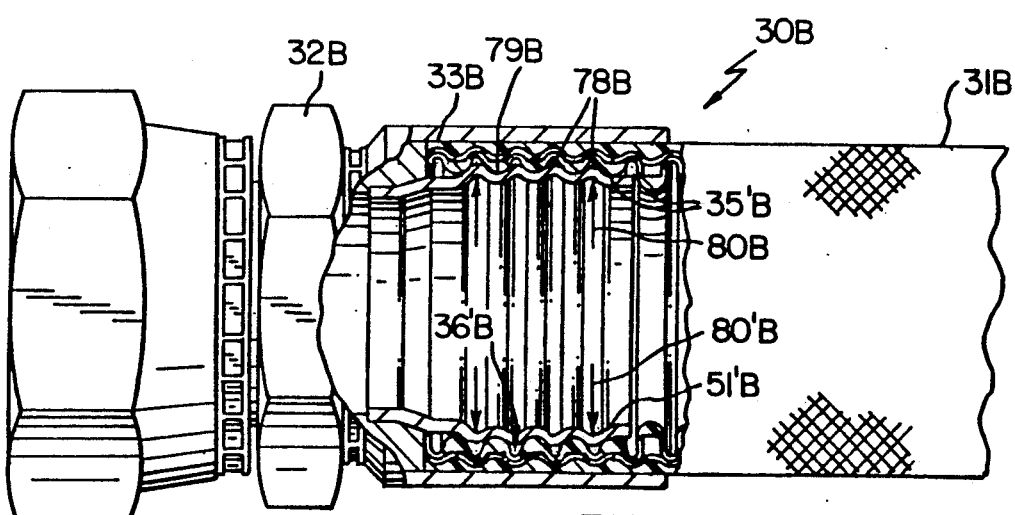
FIG. 18 is a view similar to FIG. 17 and illustrates the insert means of the coupling of FIG. 17 having been radially outwardly expanded into sealing relation with the hose of FIG. 17 to complete the hose construction of this invention.

For example, reference is now made to FIGS. 16-18 wherein another hose construction of this invention is generally indicated by the reference numeral 30B and parts thereof similar to the hose constructions 30 and 30A are indicated by like reference numerals followed by the reference letter "B".

As illustrated in FIGS. 16-18, the sleeve 51B of the coupling 32B is corrugated to define a plurality of outwardly convex projections 78B having recesses 79B provided therebetween and being of a size similar to the member 60A previously described so that when the coupling 32B is subsequently inserted in a telescoping manner with the end 33B of the hose 31B as illustrated in FIG. 17, the sleeve 51B can be radially outwardly expanded in the manner illustrated by the arrows 80B in FIG. 18 to place the projections 78B into the recesses 36'B of the inner hose 34B while the projections 35'B of the inner hose 34B are received in the recesses 79B to fluid seal the interior of the hose 31B to the interior of the coupling 32B as previously set forth As previously stated, while the various projections and recesses of the hose constructions have all been described as being annular, it is to be understood that in the various embodiments of the hose constructions of this invention, the recesses and projections thereof could be helically disposed in a manner similar to the hose construction 30C of FIGS. 19-21 which will now be described.

It can be seen in FIGS. 19-21 that the hose construction 30C is substantially the same as the hose construction 30A previously described except that the projections 35'C and recesses 36'C of the inner hose 34C of the tubular hose 31C are helically disposed and the projections 78C and recesses 79C on the member 60C of the coupling 32C are likewise disposed at the same helical angle relative to the longitudinal axis of the resulting hose construction 30C so that the end 33C of the hose 31C can be initially telescoped with the coupling 32C by either directly inserting the end 33C of the hose 31C into the coupling 32C as illustrated in FIG. 20 or by actually threading the end 33C of the hose 31C thereon through rotational movement of the hose 31C as desired.

In any event, it can be seen that once the coupling 32C and the hose 31C are fully telescoped together in the manner illustrated in FIG. 20, the insert means 31C can be radially outwardly expanded in the manner illustrated in FIG. 21 by the arrows 80C to sealingly place the projections 78C of the insert means 61C into the recesses 36'C of the inner hose 34C while the projections 35'C of the inner hose 34C are disposed in the recesses 79C of the insert means 61C to fluid seal the interior of the hose 31C to the interior of the coupling 32C as previously set forth.

Therefore, it can be seen that this invention not only provides a new hose construction and a new method of making the same, but also this invention provides a new coupling for such a hose construction and a new method of making such a coupling.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose construction comprising a tubular hose having an inner peripheral surface means and an outer peripheral surface means, and a coupling secured to one end of said tubular hose, the improvement wherein said inner peripheral surface means of said tubular hose comprises an inner corrugated hose made of polymeric material and having inwardly convex projections with recesses therebetween and extending from said one end of said tubular hose to the other end thereof and wherein said coupling has an insert means disposed in said one end of said tubular hose and being radially outwardly expanded into sealing relation with said inner corrugated hose, said insert means having an outer peripheral surface means defined by a plurality of outwardly convex projections with recesses therebetween, said projections of said insert means being respectively received in said recesses of said inner hose and said projections of said inner hose being respectively received in said recesses of said insert means whereby the interior of said tubular hose is substantially sealed to the interior of said coupling, said projections of said insert means each having a transverse cross-sectional configuration defined by a radius of a certain length and said recesses of said insert means each having a transverse cross-sectional configuration defined by a radius of a predetermined length that is longer than said certain length.

2. A hose construction as set forth in claim 1 wherein said projections of said inner hose and said insert means are respectively annular and are respectively disposed substantially transverse to the longitudinal axis of said hose construction.

3. A hose construction as set forth in claim 1 wherein said projections of said inner hose and said insert means respectively extend in a helical path about the longitudinal axis of said hose construction.

4. A hose construction as set forth in claim 1 wherein said insert means comprises an inner tubular metallic sleeve and an outer tubular polymeric sleeve telescopically disposed on said tubular metallic sleeve and having an outer peripheral surface means that comprises said outer peripheral surface means of said insert means.

5. A hose construction as set forth in claim 4 wherein said inner tubular metallic sleeve has an outer peripheral surface means provided with outwardly directed projections with recesses therebetween and wherein said outer tubular polymeric sleeve has an inner peripheral surface means provided with inwardly directed projections with recesses therebetween, said projections of said inner tubular metallic sleeve being respectively received in said recesses of said outer tubular polymeric sleeve and said projections of said outer tubular polymeric sleeve being respectively received in said recesses of said inner tubular metallic sleeve.

6. A hose construction as set forth in claim 5 wherein said outer tubular polymeric sleeve is molded onto said inner tubular metallic sleeve.

7. A hose construction as set forth in claim 5 wherein said outer tubular polymeric sleeve remains separate from said inner tubular metallic sleeve until said insert means has been radially outwardly expanded.

8. A hose construction as set forth in claim 1 wherein said insert means comprises a tubular metallic sleeve that is corrugated to define said outer peripheral surface means thereof.

9. A hose construction as set forth in claim 1 wherein said tubular hose has an outer peripheral surface means, said coupling having an outer metallic tubular member telescopically disposed over said tubular hose and being engaged by said outer peripheral surface means of said tubular hose.

10. A hose construction as set forth in claim 1 wherein said coupling has a rotatable nut means for fluidly coupling said hose construction to other structure.

11. In a method of making a hose construction comprising the steps of forming a tubular hose having an inner peripheral surface means and an outer peripheral surface means, and securing a coupling to one end of said tubular hose, the improvement comprising the steps of forming said inner peripheral surface means of said tubular hose to comprise an inner corrugated hose made of polymeric material and having inwardly convex projections with recesses therebetween and extending from said one end of said tubular hose to the other end thereof, forming said coupling to have an insert means disposed in said one end of said tubular hose and being radially outwardly expanded into sealing relation with said inner corrugated hose, forming said insert means to have an outer peripheral surface means defined by a plurality of outwardly convex projections with recesses therebetween, forming said projections of said insert means to each have a transverse cross-sectional configuration defined by a radius of a certain length and said recesses of said insert means to each have a transverse cross-sectional configuration defined by a radius of a predetermined length that is longer than said certain length, and forming said projections of said insert means to be respectively received in said recesses of said inner hose and said projections of said inner hose to be respectively received in said recesses of said insert means whereby the interior of said tubular hose is substantially sealed to the interior of said coupling.

12. A method of making a hose construction as set forth in claim 11 and including the step of forming said projections of said inner hose and said insert means to be respectively annular and to be respectively disposed substantially transverse to the longitudinal axis of said hose construction.

13. A method of making a hose construction as set forth in claim 11 and including the step of forming said projections of said inner hose and said insert means to respectively extend in a helical path about the longitudinal axis of said hose construction.

14. A method of making a hose construction as set forth in claim 11 and including the step of forming said insert means to comprise an inner tubular metallic sleeve and an outer tubular polymeric sleeve telescopically disposed on said tubular metallic sleeve and having an outer peripheral surface means that comprises said outer peripheral surface means of said insert means.

15. A method of making a hose construction as set forth in claim 14 and including the steps of forming said inner tubular metallic sleeve to have an outer peripheral surface means provided with outwardly directed projections with recesses therebetween, forming said outer tubular polymeric sleeve to have an inner peripheral surface means provided with inwardly directed projections with recesses therebetween, and forming said projections of said inner tubular metallic sleeve to be respectively received in said recesses of said outer tubular polymeric sleeve and said projections of said outer tubular polymeric sleeve to be respectively received in said recesses of said inner tubular metallic sleeve.

16. A method of making a hose construction as set forth in claim 15 and including the step of molding said outer tubular polymeric sleeve onto said inner tubular metallic sleeve.

17. A method of making a hose construction as set forth in claim 15 and including the step of forming said outer tubular polymeric sleeve to remain separate from said inner tubular metallic sleeve until said insert means has been radially outwardly expanded.

18. A method of making a hose construction as set forth in claim 11 and including the step of forming said insert means to comprise a tubular metallic sleeve that is corrugated to define said outer peripheral surface means thereof.

19. A method of making a hose construction as set forth in claim 11 and including the steps of forming said tubular hose to have an outer peripheral surface means and forming said coupling to have an outer metallic tubular member telescopically disposed over said tubular hose and be engaged by said outer peripheral surface means of said tubular hose.

20. A method of making a hose construction as set forth in claim 11 and including the step of forming said coupling to have a rotatable nut means for fluidly coupling said hose construction to other structure.

* * * * *